I. H. WRIGHT.
GEAR CUTTING MACHINE.
APPLICATION FILED JUNE 1, 1920.

1,423,062.

Patented July 18, 1922.
8 SHEETS—SHEET 1.

Inventor
I. H. Wright,
By H. R. Kerslake
Attorney

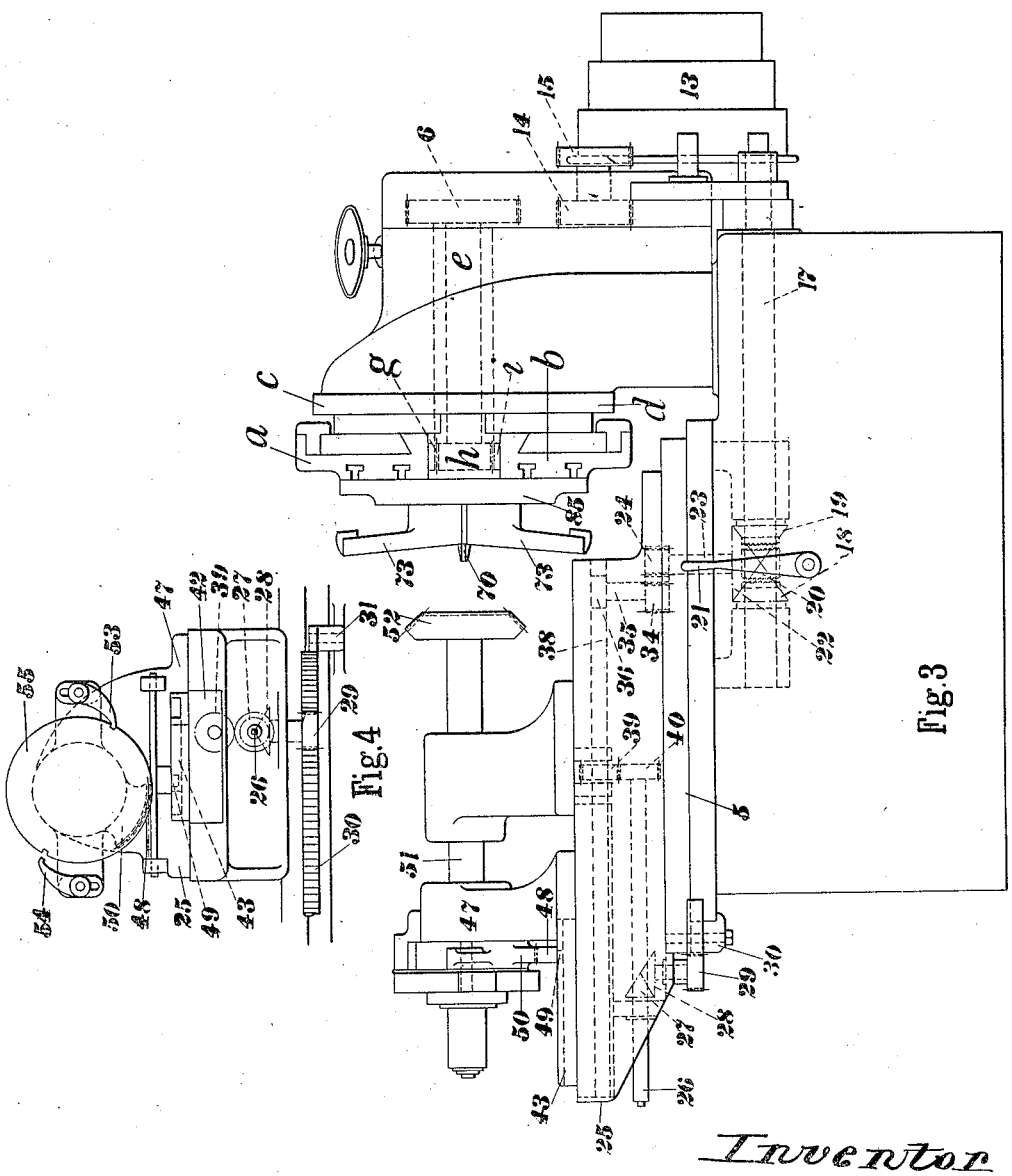

I. H. WRIGHT.
GEAR CUTTING MACHINE.
APPLICATION FILED JUNE 1, 1920.

1,423,062.

Patented July 18, 1922.
8 SHEETS—SHEET 5.

Inventor
I. H. Wright
By H. R. Kerslake
Attorney

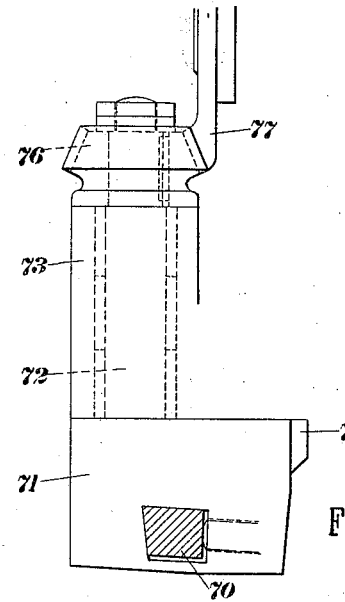
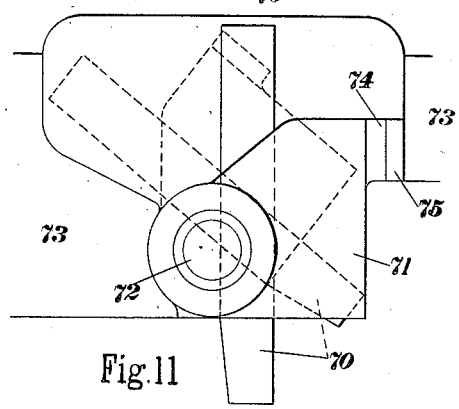
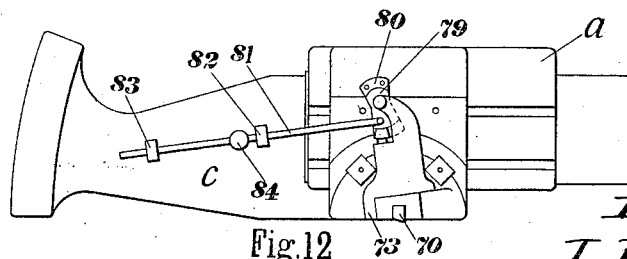

UNITED STATES PATENT OFFICE.

ISAAC HENRY WRIGHT, OF SALFORD, ENGLAND.

GEAR-CUTTING MACHINE.

1,423,062.  Specification of Letters Patent.  Patented July 18, 1922.

Application filed June 1, 1920. Serial No. 385,688.

*To all whom it may concern:*

Be it known that I, ISAAC HENRY WRIGHT, a subject of the King of Great Britain and Ireland, and resident of Gresley Ironworks, Salford, in the county of Lancaster, England, have invented certain new and useful Improvements in Gear-Cutting Machines, of which the following is a specification.

This invention relates to gear cutting machines, particularly to machines for cutting bevel and like gear wheels and of the type in which cutting tools, operating simultaneously on both sides of a tooth, are reciprocated on automatically adjusting or opening and closing guide arms in lines or paths always directed towards the apex of the pitch cone of the wheel, the work being indexed or angularly moved by a ratchet and pawl or the like for each reciprocation of the cutting tools.

The object of the invention is to provide for the convenient and accurate setting of the teeth to a spiral configuration.

The invention comprises the combination with cutting tools operating simultaneously on both sides of a tooth and reciprocated on automatically adjusting or opening and closing guide arms in lines or paths always directed towards the apex of the pitch cone of the wheel being cut, of means for imparting an angular movement to the work whilst the tools are cutting the same such as will give the desired spiral configuration to the teeth.

The invention further comprises the arrangement whereby the tools are automatically moved clear of the work during their return or inoperative stroke.

The invention further comprises the improved arrangements and combinations of parts hereinafter described and claimed.

Referring to the accompanying explanatory drawings:—

Figure 3 is an end view of the machine looking from right to left of Figure 1.

Figure 4 is a detail view of the means for turning the blank being cut.

Figure 10 is a detail view showing the tool in section in its holding block.

Figure 11 is a plan view showing the tool holding block in its service and out of service positions.

Figure 12 is a further detail view illustrating the means for turning the tool holder into its service and out-of-service positions.

The same reference letters in the different views indicate the same parts.

The cutter carrying slides $a$, $b$ are carried upon the arms $c$, $d$ pivoted at $e$, the upper slide $a$ being reciprocated by the pinion $f$ engaging the rack $g$ and the lower slide $b$ being reciprocated by the pinion $h$ engaging the rack $i$. The pinions $f$ and $h$ intermesh so that the two slides are traversed simultaneously in the same direction. Each arm $c$, $d$ carries adjustably mounted thereon, a roller $j$, $k$ which enters a cam groove $m$ in a generator plate $n$. The latter is arranged and operates substantially as described. The arms $c$, $d$ are balanced against one another by means of a steel band indicated at $o$ connected at its opposite ends to the arms and passing over the pulley or roller $p$.

The generator plate $n$ is traversed upon the slide $q$ by the toothed sector $r$ engaging rack teeth on the said plate. The movement of the sector $r$ is effected by the connecting rod $s$ which is adjustably connected to said sector and to an arm $t$ clamped by a bolt $u$ to a worm wheel $v$ engaged by a worm $w$ upon the shaft $x$. The latter may have a squared end $y$ so that it can be turned by hand for setting purposes. A bevel wheel $z$ upon the shaft $x$ gears with a bevel wheel $2$ upon the shaft $3$ which is screw threaded and works in a nut $4$ upon the work carrying table $5$. With this arrangement the movement of the work table $5$ has a definite relationship to the movement of the generator plate.

Figure 1:
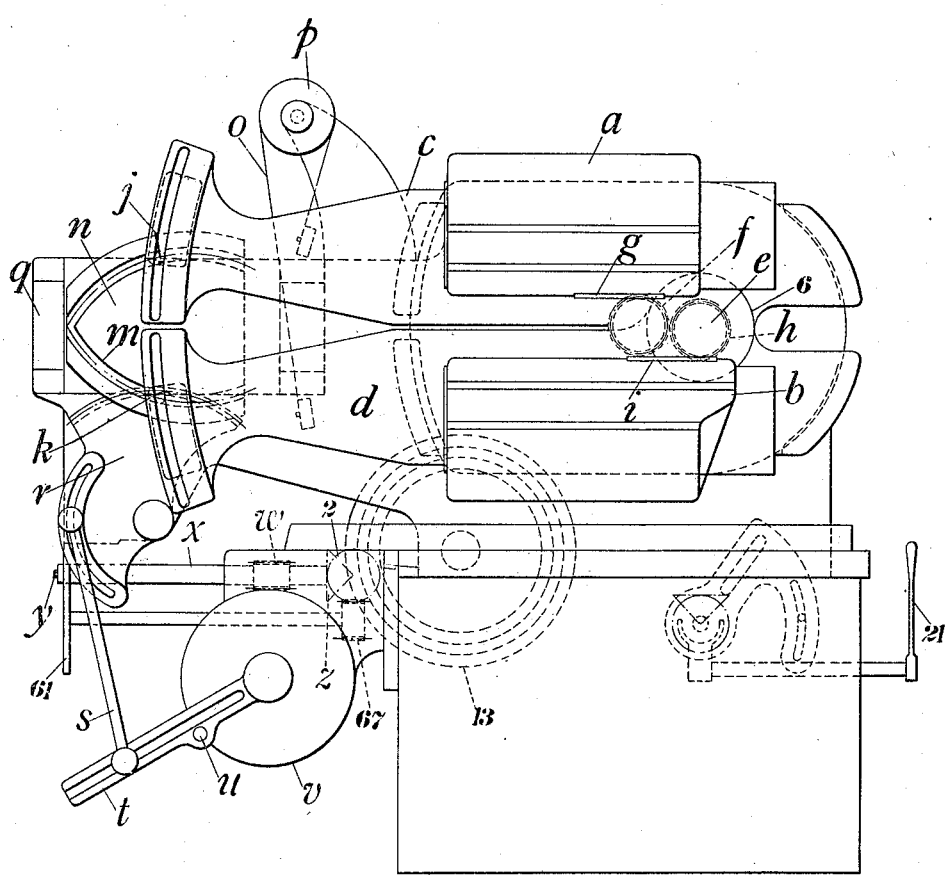
Figure 1 is a front view of the gear cutting machine illustrating the cutter carrying slides and arms and their actuating mechanism.
Figure 2:
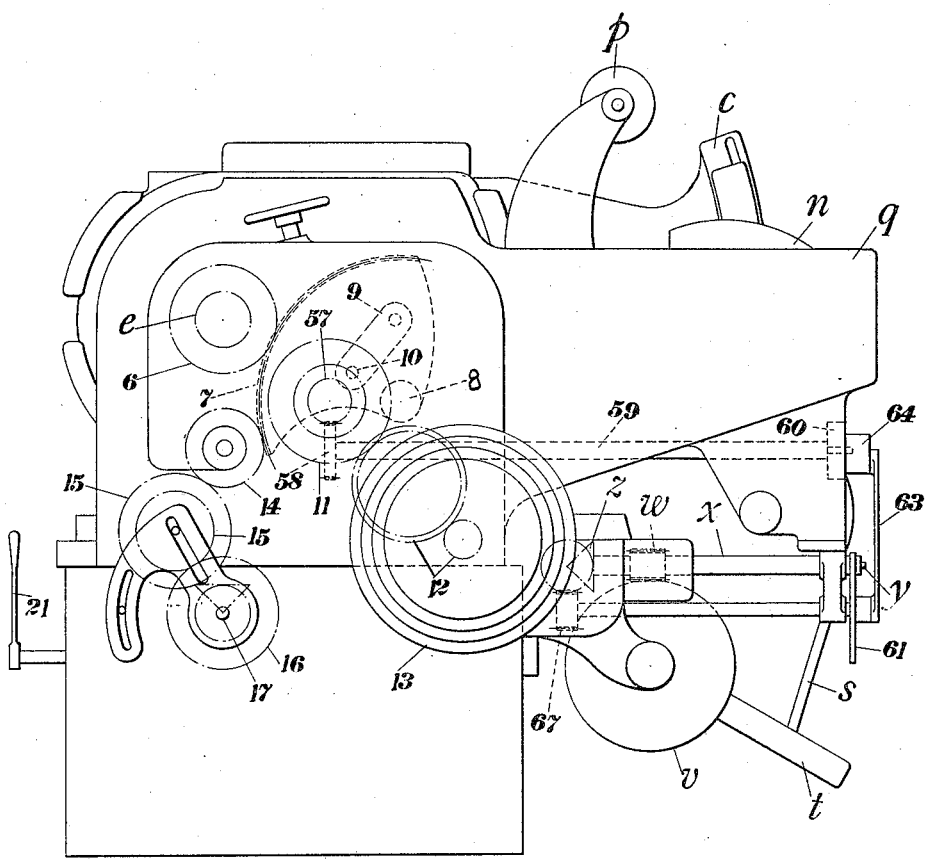
Figure 2 is a back view of the machine.

The reciprocation of the tool carrying slides $a$, $b$ is effected as follows:—The pinion $h$ is fixed upon the shaft $e$ forming the fulcrum of the arms $c$, $d$, the said shaft carrying a spur wheel 6 engaging a sector 7 (see Figure 2). The latter is rocked about its fulcrum 8 by a link 9 connecting the said sector to the crank pin 10 which is made adjustable upon the crank disc 11. The latter is rotated by gearing 12 from the cone pulleys 13 or from any other source of power.

The sector 7 also engages a spur wheel 14 which through change gear wheels 15 rotates the gear wheel 16 on the shaft 17. The latter carries two bevel pinions 18, 19 loose thereon and capable of being clutched thereto by the claw clutch 20 operated by the handle 21, the said bevel wheels 18, 19, mesh with a bevel wheel 22 on the vertical shaft 23 co-axial with the vertical axis of the machine about which the work table 5 moves. The said vertical shaft 23 carries a pinion 24 at its upper end. The bevels 18, 19 and 22 with the clutch 20 serve as a reversing gear for the purpose hereinafter described.

Upon the work table 5 is carried a saddle 25 which swivels about the vertical axis of the machine and capable of adjustment upon the work table by means of the square ended shaft 26 with the bevel wheel 27 thereon, bevel wheel 28, rack pinion 29 and rack 30. The latter is anchored to the machine base at 31, see Figure 4. The saddle 25 can be moved from a position parallel with to one at right angles to the cutter slides $a$ and $b$ and can be bolted to the work table by bolts 32 engaging annular T grooves 33 in the table.

Figure 5:
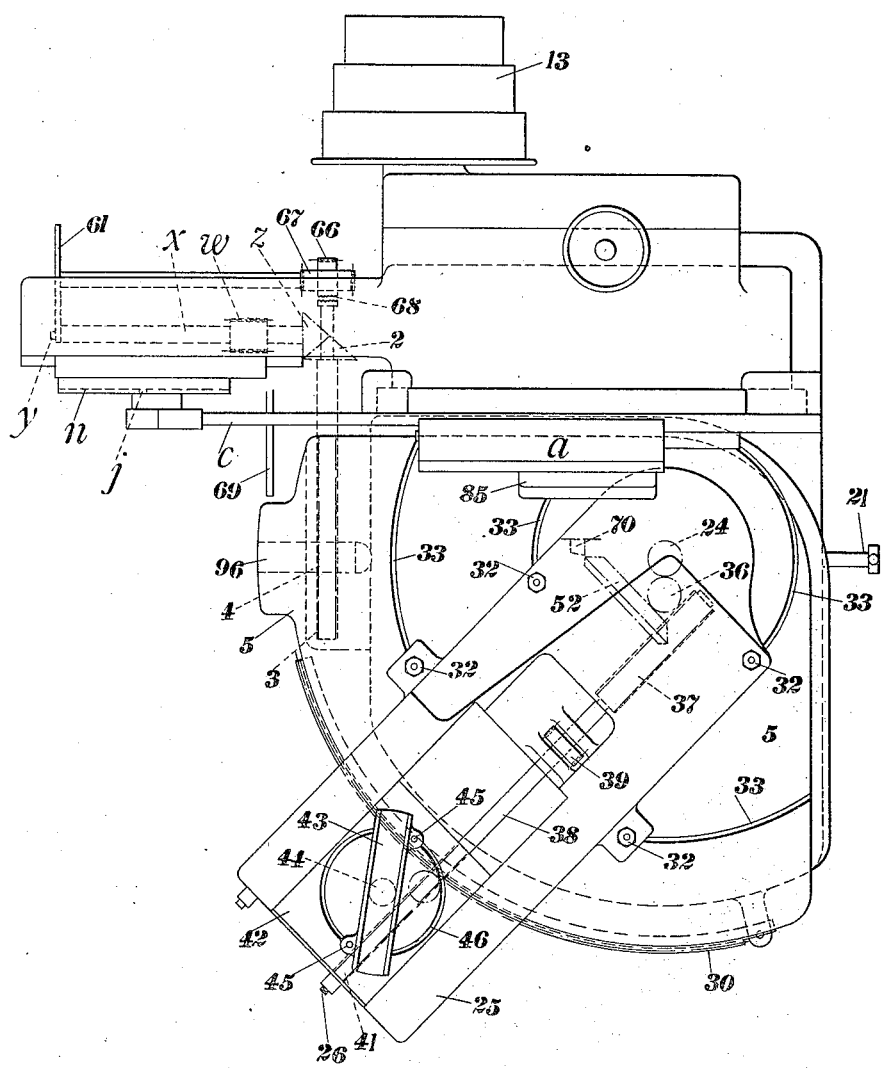
Figure 5 is a plan view of the machine with the head carrying the blank being cut removed from position.

The pinion 24, Figures 3 and 5, meshes with a pinion 34 on the short shaft 35 carrying a rack pinion 36 at its upper end which engages a rack 37 held between collars upon the shaft 38 having the spur wheel 39 feather keyed thereon. The wheel 39 meshes with a spur wheel 40 on the shaft 26 (see Figure 3) by which angular motion for compensation purposes is given to the saddle 25 as hereinafter explained. The end of the shaft 38 is screw threaded at 41 and works through a nut on the slide 42 so as to reciprocate the latter. It will be seen that the shaft 38 can be reciprocated by the pinion 36 and can be rotated by the rolling of the pinion 29 on the stationary rack 30 (which motion is transmitted to 38 through the bevel wheels 28, 27, shaft 26 and spur wheels 40 and 39) as the saddle moves in an arc of a circle about the vertical axis of the machine. The rotation of the shaft 38 in this manner serves to compensate for the rolling of the pinion 34 about the pinion 24 and ensures the uniform reciprocatory movement of the slide 42 notwithstanding variations in the angular movement of the saddle 25 relatively to the cutter slide.

The slide 42 carries a grooved member 43 which is angularly adjustable about its axis 44 and can be locked in any desired position by suitable means, such as by bolts at 45 which enter the annular T groove 46. The head 47 (see Figures 3 and 4) is fixed upon the saddle 25 and carries a sliding rack 48 which is reciprocated by the grooved member 43, by means of a stud on the rack having thereon a sliding block 49 which enters the groove in 43. The rack 48 which moves in a direction at right angles to the movement of the slide 42, engages a sector 50 (which is oscillated by the said rack) upon one end of the spindle 51, the other end of which carries the blank 52 being cut. The sector 50 has an arm-like extension thereon carrying a pawl 53 which is adjustable upon said arm in a circumferential direction. A detent 54 carried by a bracket upon the saddle, and also adjustable in a circumferential direction relatively to the dividing wheel 55, prevents backward rotation of the latter when it is released by the pawl 53. The dividing wheel 55 has a number of teeth which is a multiple of the number of teeth being cut in the blank and it is rotated intermittently by the pawl 53 and whilst the latter is returning to its initial position is held against movement by the detent 54. By varying the angularity of the member 43, the amount of traverse given to the rack 48 and so the amount of oscillation of the sector 50 and its pawl 53 are varied.

Adjustment of the angular position of the grooved member 43 and alteration of the change wheels rotating the shaft 17 from the wheel 14, will effect a variation in the amount of angular movement imparted to the blank 52 during each cycle of the machine. Further, by the use of the reverse gear 18, 19, 20, 22 and by changing the direction of the pawl 53 and detent 54 with reference to their fulcrum points, wheels with teeth of opposite hand spirals can be produced. It will of course be understood that the blank is turned by the pawl 53 during the cutting stroke of the tools upon the slides $a$, $b$ and that the blank is held stationary whilst the said slides move back on their idle or non-cutting strokes. The angular distance through which the blank is turned during each cutting stroke of the cutting tools may be such that the tools act successively upon each tooth, or every alternate tooth or every third tooth, as the case may be.

Figure 6:
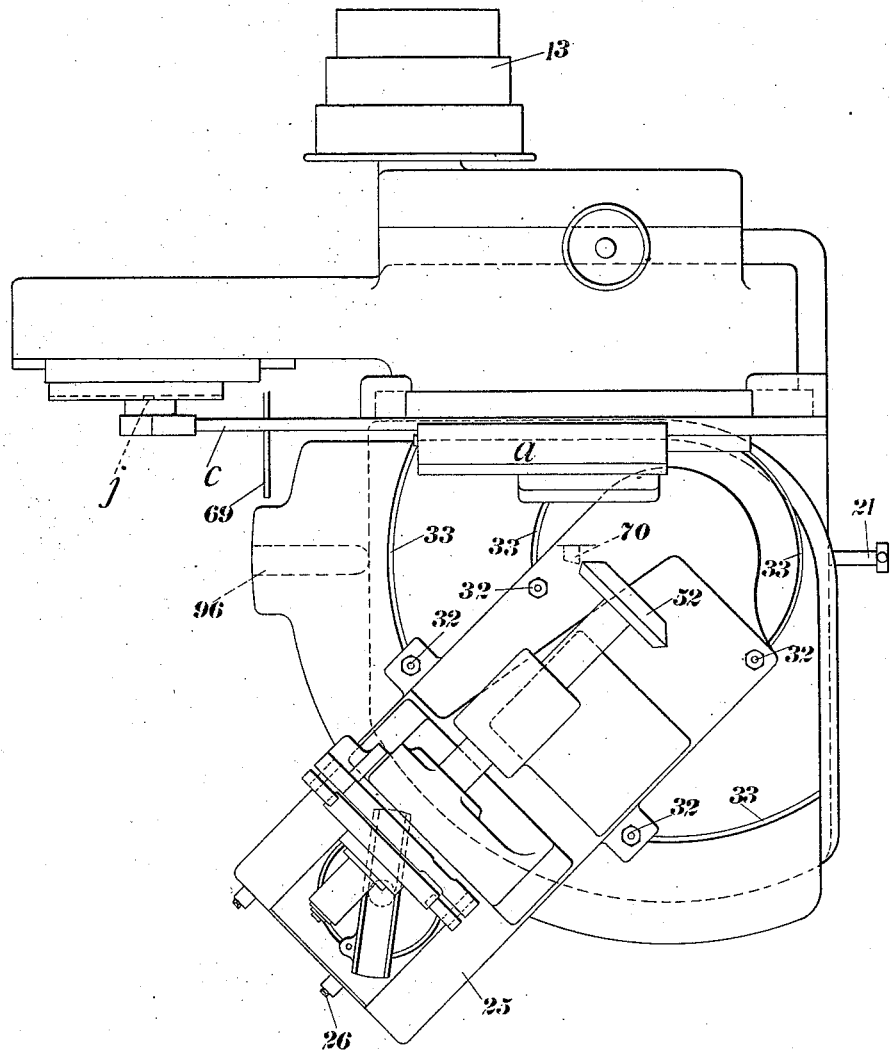
Figure 6 is a view similar to Figure 5 but with the head carrying the blank in position.

The feed movement for increasing the depth of cut is obtained as follows:—Upon the shaft carrying the crank disc 11 is provided a worm 57 which actuates a worm 58 upon a shaft 59, the latter having thereon a crank disc 60 operating the ratchet wheel 61 by the pawl 62, connecting rod 63 and slotted arm 64 pivoted at 65. The position of the end of the rod 63 in the arm 64 determines the amount of movement given to the ratchet wheel 61 for each rotation of the crank disc 60. The movement of the ratchet wheel is transmitted by the worm 67 and worm wheel 66 to the screwed shaft 3 and so to the table 5. A dog clutch 68 permits of the automatic feed movement being put out of action. This is accomplished when the work table 5 has moved through the required distance, by the projecting part shown to the left of Figures 5 and 6 engaging the trip rod 69 which through suitable means (not shown) releases the clutch. The feed movement is automatically disengaged, therefore when the proper depth of tooth has been reached.

Figure 9:
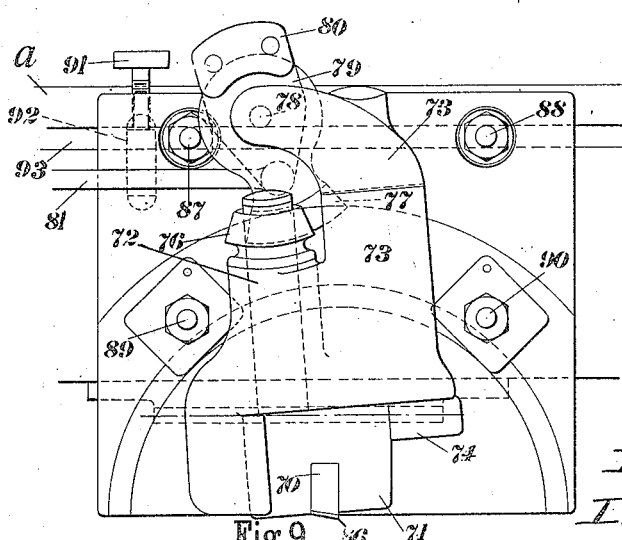

As the blank is rotated during the cutting strokes of the tools so as to produce the required spiral form of tooth, and as the blank is stationary during the return stroke of the tools, it is necessary to provide means to move the cutting tools clear of the blank during such return stroke. This is accomplished as follows:—The cutting tools 70 are each carried by a tool block 71 mounted upon a fulcrum pin 72 (see Figure 9) obliquely disposed with relation to the tool and working within a bracket 73. The block 71 has a part 74 (Figures 10 and 11) which abuts firmly against the part 75 on the bracket 73 when the tool 70 is in its cutting position. The fulcrum pin 72 carries a bevel pinion 76 at its upper end which meshes with a sector 77 fulcrumed upon a pin 78 in the bracket 73. Behind the sector 77 is disposed a plate 79, also fulcrumed about the pin 78, and connected to the sector by a friction grip, provided by the front plate 80 between which and the plate 79, the edge of the sector 77 is clamped. The plate 79 is moved by a rod 81 having two adjustable stops 82, 83 (see Figure 12) thereon and passing through a stop 84 fixed upon the cutter slide carrying arm c. The stops 82, 83 are so positioned that, as the cutter slide a arrives at the end of its travel, the sector 77 is turned first to remove the cutter 70 clear of the blank being cut and then at the end of the idle or return stroke of the cutter slide to return the cutter to its operative position. The out-of-service position of the tool 70 is shown in dotted lines in Figure 11. The friction grip 79, 80 allows of relative movement of the plate 79 and sector 77 should there be an obstruction to the movement of the tool. Breakage of parts is thereby prevented. If desired, I may provide springs between the fixed stop 84 and the adjustable stops 82, 83 to cushion the motion of the rod 81 and connected parts.

The cutter or tool 70 is held in position in the block 71 by screws in the ordinary manner but I preferably make the tool of a non-rectangular section (see Figure 10) in order that the pressure of the screws will always return it with two faces correctly located in the tool block after the tool has been removed for grinding or other purposes.

The bracket 73 is clamped upon a base piece 85 and is angularly adjustable about the point 86 which is the natural location of the cutting point of the tool 70. The angular adjustment aforesaid is necessary in order to present the cutting tool at the correct cutting angle to the relatively moving spiral tooth being formed on the blank.

To obtain a fine setting of the tool position so as to raise or lower it, the base 85 is clamped to the slide a by four bolts 87, 88, 89, 90, the bolts 87, 88 and 89 passing through elongated slots in the base piece 85 whilst the other bolt 90 is a good fit in its hole through said base piece. When therefore the nuts upon the bolts are loosened, the base piece can be swivelled about the bolt 90. This is accomplished by the milled head screw 91 which engages the block 92 supported in the groove 93 in the cutter slide a.

It will of course be understood that similar arrangements for operating the cutter or tool are provided on both the cutter slides a, b.

Figure 7:
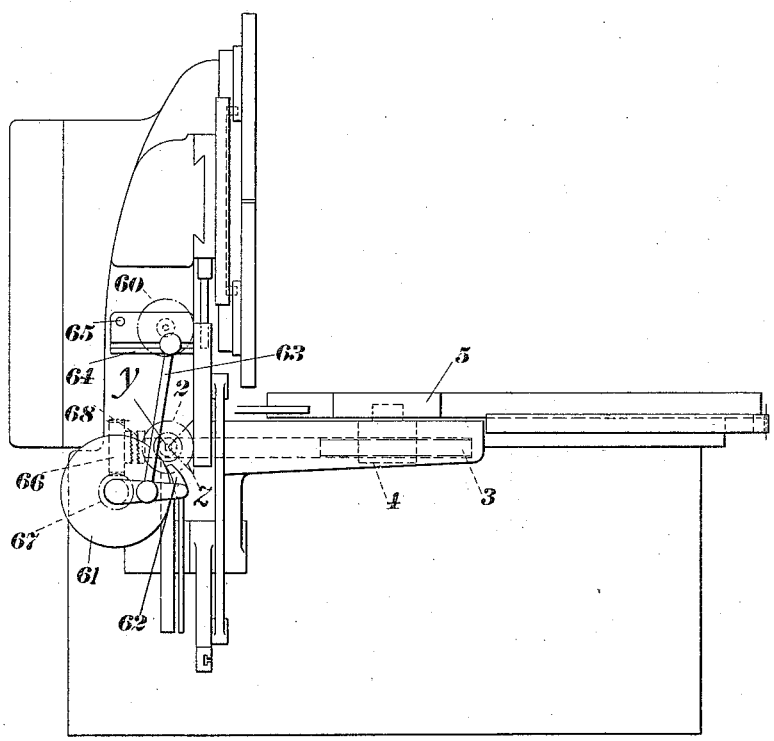
Figure 7 is an end view looking from left to right of Figure 1.
Figure 8:
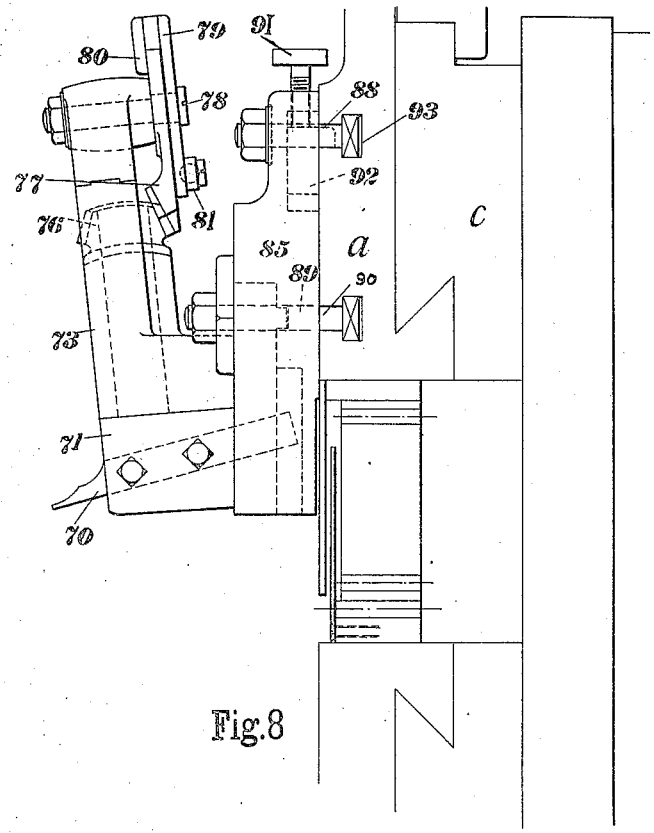
Figures 8 and 9 are detail views at right angles to one another of the tool holding and actuating devices.

The operation of the machine is as follows:—The belt pulley 13 through the medium of the gear wheels 12, causes the rotation of the crank disc 11 and so the oscillation of the sector 7. The worm 57 on the crank disc shaft actuates the feed motion for moving the table 5 and so increasing the depth of cut taken by the tools by means of the worm wheel 58, shaft 59, crank disc 60, pivoted slotted arm 64, connecting rod 63 (Figure 2), pawl 62 (Figure 7) ratchet wheel 61, worm wheel 66, worm 67, screw 3 and nut 4 connected to the table 5. The nut 4 can move in a slot 96 in the table in a radial direction to compensate itself for the changes occasioned by the angular movement of the table. The sector r which traverses the grooved former n is also operated from the feed motion before described by means of the connecting rod s, arm t, worm wheel v, worm w and bevel pinions z, 2, the latter being on the shaft carrying the worm wheel 66. The clutch 68 controls both the feed motion to the table 5 and to the former n. The sector 7 by means of the wheel 6, shaft e, intermeshing wheels f and h and racks g and i respectively reciprocates the tool carrying slides a and b upon the arms c and d. The sector 7 also by means of the train of change gear wheels 14, 15, 16, shaft 17, bevel wheels 18, 19, 22, clutch 20, shaft 23, wheels 24, 34 and 36 actuates the rack 37 by which the grooved member 43 is reciprocated and the blank 52 rotated through the pawl and ratchet mechanism shown in Figure 4. All the required motions are therefore obtained in the proper unison. The tools are turned into and out of their operative positions by the stops 84 upon the arms c and d.

As both the reciprocatory movements of the tool slides and the angular movements of the blank being cut are obtained from the one sector 7, there will always be similarity or unison in the movements of the slides and blank. That is to say, any variation in the speed of the slides due to the action of the crank pin 10 and link 9 will be accompanied by corresponding variations in the angular movements of the blank and thus accuracy in tooth production is obtained.

If desired, the improved machine can be readily adapted for cutting ordinary bevel wheels by causing the tools 70 to have their cutting stroke whilst the blank 52 is stationary, the blank being turned by the means shown in Figure 4, whilst the tools are clear thereof.

I may vary the details of my improved machine to suit any particular services or requirements.

Having now described my invention what I claim as new and desire to secure by Letters Patent is:—

1. In gear cutting machines, the combination with a pair of balanced arms, a common pivot for said arms, means for moving said arms about said pivot, and tool carrying slides upon said arms, of a work blank carrier and means simultaneously rotating said carrier and traversing said slides on their forward or operative strokes, as set forth.

2. In a gear cutting machine as claimed in claim 1, the combination with a main driving shaft for the machine, of an oscillatory member actuated therefrom, and means imparting reciprocatory movements to the tool slides and angular movement to the gear blank from said oscillatory member, as set forth.

3. In gear cutting machines, in combination, cutter slide carrying arms, a former, means for traversing said former, means upon the said arms engaging said former, cutter slides upon said arms, means for traversing said slides, tool carrying means upon said slides, means for imparting a turning movement to the tools to move them into and out of their operative positions, a work carrying table, means imparting angular movements thereto, a blank carrying saddle upon said table, means imparting angular movements to the blank upon said saddle during the cutting stroke of the tools, and for holding the blank stationary during the return or idle strokes of the tools, and means for compensating for the angular movements of the saddle about the part from which the motion of the blank is derived, as set forth.

4. In gear cutting machines as claimed in claim 3, the improved means for actuating the cutting tools so as to move them into and out of their operative positions, substantially as described and as illustrated in Figures 8 to 12 of the drawings.

5. In gear cutting machines as claimed in claim 3, the improved means for operating the blank being cut, substantially as described with reference to Figures 3 to 6 of the drawings.

In testimony whereof I have signed my name to this specification.

ISAAC HENRY WRIGHT.